(12) United States Patent
Ronciak et al.

(10) Patent No.: US 7,602,798 B2
(45) Date of Patent: Oct. 13, 2009

(54) TECHNIQUES TO REDUCE LATENCY IN RECEIVE SIDE PROCESSING

(75) Inventors: John Ronciak, Beaverton, OR (US); Christopher Leech, Portland, OR (US); Prafulla Deuskar, Hillsboro, OR (US); Jesse Brandeburg, Portland, OR (US); Patrick Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 10/929,124

(22) Filed: Aug. 27, 2004

(65) Prior Publication Data

US 2006/0045090 A1    Mar. 2, 2006

(51) Int. Cl.
*H04L 12/56* (2006.01)

(52) U.S. Cl. .................. 370/412; 370/413; 370/414; 370/415; 370/416

(58) Field of Classification Search ............... None
See application file for complete search history.

(56) References Cited

U.S. PATENT DOCUMENTS

| | | | |
|---|---|---|---|
| 6,434,620 B1 | 8/2002 | Boucher et al. | |
| 2004/0013117 A1* | 1/2004 | Hendel et al. | 370/394 |
| 2004/0062246 A1 | 4/2004 | Boucher et al. | |
| 2004/0100952 A1* | 5/2004 | Boucher et al. | 370/389 |

FOREIGN PATENT DOCUMENTS

WO    WO 99/26377 A2    5/1999

OTHER PUBLICATIONS

European Patent Office, International Search Report and Written Opinion for International Application No. PCT/US2005/027222, 15 pages, Oct. 20, 2005.
Postel, J., Editor, "*Transmission Control Protocol—DARPA Internet Program Protocol Specification*", STD 7, RFC 793, USC/Information Sciences Institute, Sep. 1981 (located at http://www.ibiblio.org/pub/docs/rfc/rfc793.txt).
PCT International Preliminary Report On Patentability (Chapter I of the Patent Cooperation Treaty), Application No. PCT/US2005/027222, issued Feb. 28, 2007.
Copy of PCT Search Report date Mar. 8, 2007.

* cited by examiner

*Primary Examiner*—Jayanti K Patel
*Assistant Examiner*—Anthony Sol
(74) *Attorney, Agent, or Firm*—Blakely, Sokoloff, Taylor & Zafman LLP

(57) ABSTRACT

Techniques for accelerating network receive side processing of packets. Packets may be associated into flow groupings and stored in flow buffers. Packet headers that are available for TCP/IP processing may be provided for processing. If a payload associated with a header is not available for processing then a descriptor associated with the header is tagged as indicating the payload is not available for processing.

33 Claims, 6 Drawing Sheets

TECHNIQUES TO REDUCE LATENCY IN RECEIVE SIDE PROCESSING

RELATED ART

Networking is an integral part of computer systems. Advances in network bandwidths, however, have not been fully utilized due to latency that may be associated with processing protocol stacks. Latency may result from bottlenecks in the computer system from using the core processing module of a host processor to perform slow memory access functions such as data movement, as well as host processor stalls related to data accesses missing the host processor caches. A protocol stack refers to a set of procedures and programs that may be executed to handle packets sent over a network, where the packets may conform to a specified protocol. For example, TCP/IP (Transport Control Protocol/Internet Protocol) packets may be processed using a TCP/IP stack.

BRIEF DESCRIPTION OF THE DRAWINGS

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
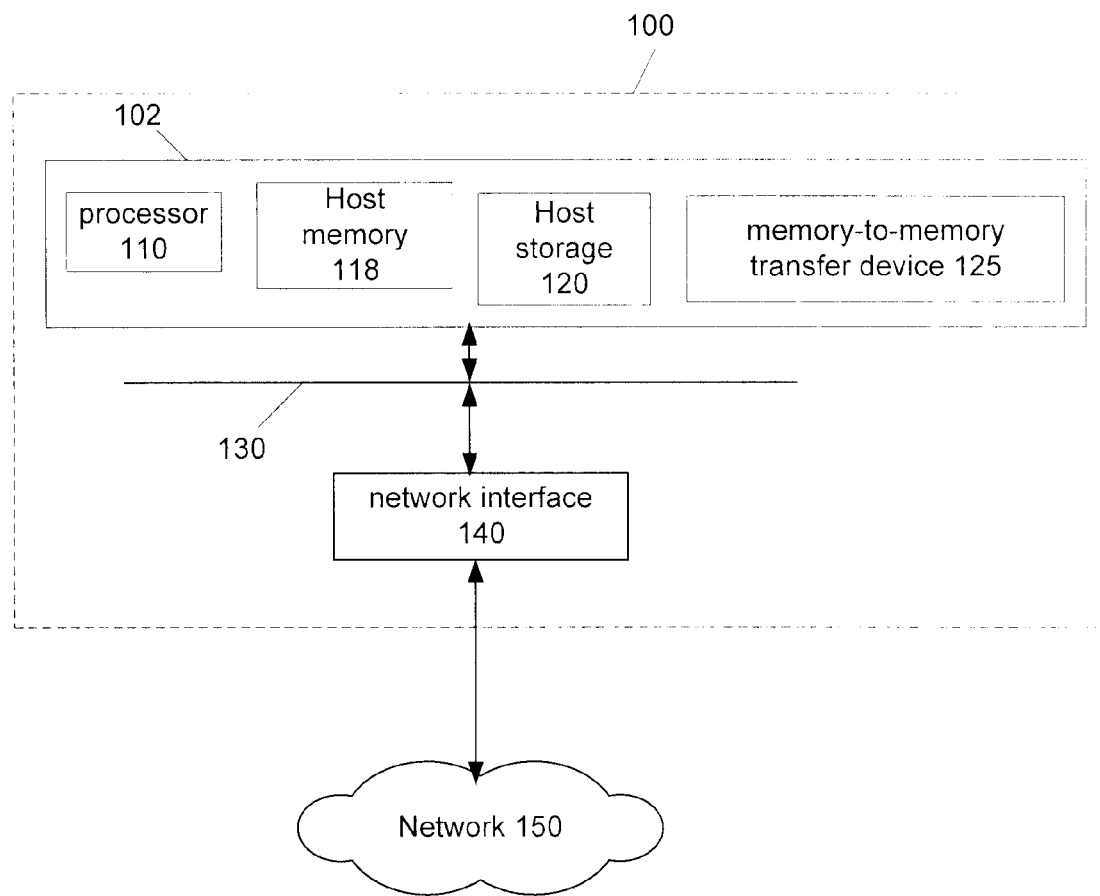
FIG. 1 depicts an example computer system that can use embodiments of the present invention.

FIG. 1 depicts an example computer system 100 that can use embodiments of the present invention. Computer system 100 may include host system 102, bus 130, and network interface 140. Host system 102, bus 130, and network interface 140 may intercommunicate using a single circuit board, such as, for example, a system motherboard. The system motherboard may include a graphics interface in compliance for example with the VGA and SVGA standards.

Host system 102 may include processor 110, host memory 118, host storage 120, and memory-to-memory transfer device 125. Processor 110 may be implemented as Complex Instruction Set Computer (CISC) or Reduced Instruction Set Computer (RISC) processors, a dual core processor, or any other processor. Host memory 118 may be implemented as a volatile memory device (e.g., RAM, DRAM, or SRAM). Host storage 120 may be implemented as a magnetic disk drive, optical disk drive, tape drive, an internal storage device, an attached storage device, and/or a network accessible storage device. Routines and information stored in host storage 120 may be loaded into host memory 118 and executed by processor 110. Memory-to-memory transfer device 125 may include the capability to at least perform memory to memory transfer operations within host memory 118, within host storage 120, and between host memory 118 and host storage 120. For example, memory-to-memory transfer device 125 may perform direct memory access (DMA) operations.

Processor 110 may be communicatively coupled to a chipset (not depicted). The chipset may comprise a host bridge/hub system that may couple processor 110, host memory 118, memory-to-memory transfer device 125 to each other and to bus 130. The chipset may also include an I/O bridge/hub system (not shown) that may couple the host bridge/bus system to bus 130. The chipset may include one or more integrated circuit chips, such as those selected from integrated circuit chipsets (e.g., graphics memory and I/O controller hub chipsets), although other one or more integrated circuit chips may also, or alternatively, be used.

Bus 130 may provide intercommunication between host system 102 and network interface 140. Bus 130 may support node-to-node or node-to-multi-node communications. Bus 130 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); serial ATA described for example at "Serial ATA: High Speed Serialized AT Attachment," Revision 1.0, published on Aug. 29, 2001 by the Serial ATA Working Group (as well as related standards); Universal Serial Bus (USB) (and related standards); as well as other interconnection standards.

Computer system 100 may utilize network interface 140 to intercommunicate with network 150. Network 150 may be any network such as the Internet, an intranet, a local area network (LAN), storage area network (SAN), a wide area network (WAN), or wireless network. Network 150 may exchange traffic with computer system 100 using the Ethernet standard (described in IEEE 802.3 and related standards) or any communications standard.

Figure 2:
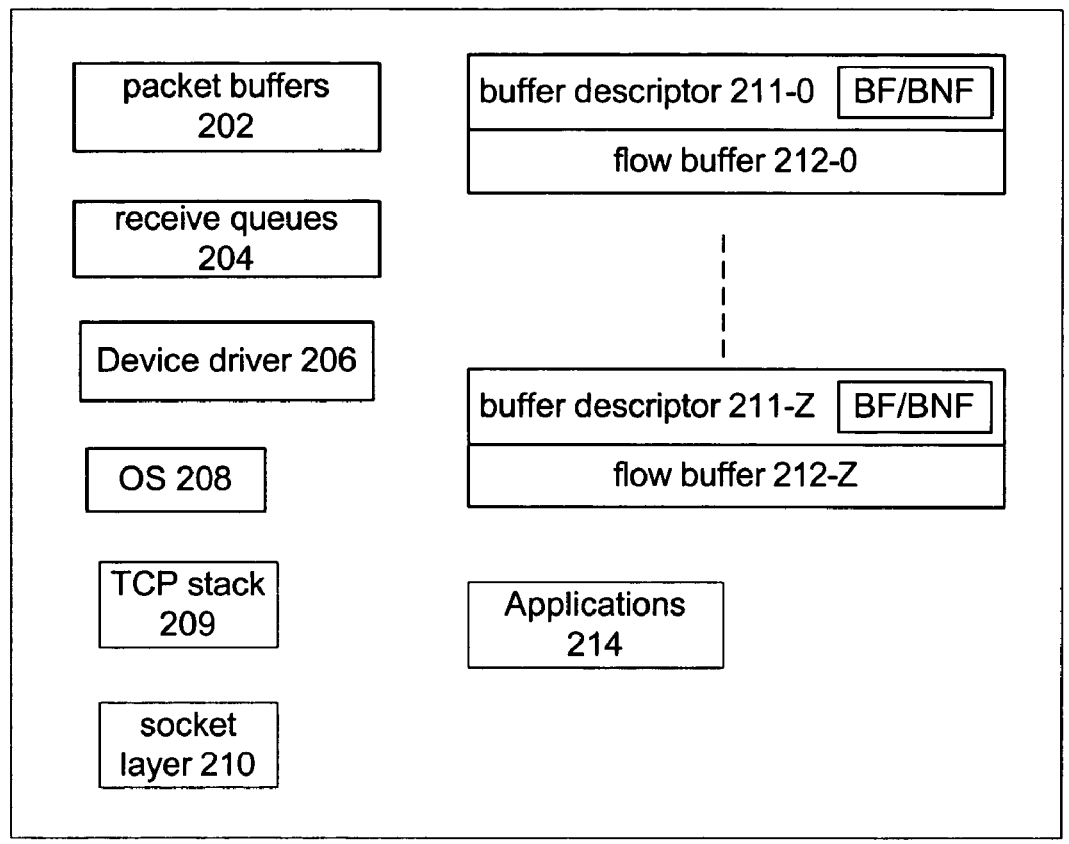
FIG. 2 depicts an example of machine-executable instructions, in accordance with an embodiment of the present invention.

FIG. 2 depicts an example of machine-executable instructions capable of being executed, and/or data capable of being accessed, operated upon, and/or manipulated by devices and that may be stored in host memory 118, in accordance with an embodiment of the present invention. In this example, host memory 118 may store packet buffers 202, receive queues 204, device driver 206, operating system (OS) 208, TCP stack 209, socket layer 210, buffer descriptors 211-0 to 211-Z, flow buffers 212-0 to 212-Z, and applications 214.

Packet buffers 202 may include multiple buffers and each buffer may store at least one ingress packet received from a network (such as network 150). Packet buffers 202 may store packets received by network interface 140 that are queued for processing at least by device driver 206, OS 208, TCP stack 209, and/or applications 214.

Receive queues 204 may include input queues and output queues. Input queues may be used to transfer descriptors from host system 102 to network interface 140. A descriptor may describe a location within a buffer and length of the buffer that is available to store an ingress packet. Output queues may be used to transfer return descriptors from network interface 140 to host system 102. A return descriptor may describe the buffer in which a particular ingress packet is stored within packet buffer 202 and identify features of the packet such as, but not limited to, the length of the ingress packet, RSS hash values and packet types, and checksum pass/fail.

Device driver 206 may be a device driver for network interface 140. Device driver 206 may create descriptors and may manage the use and allocation of descriptors in receive queue 204. Device driver 206 may request that descriptors be transferred to the network interface 140 using an input receive queue. Device driver 206 may signal to network interface 140 that a descriptor is available on the input receive queue. Device driver 206 may process notifications from network interface 140 that inform the host system 102 of the storage of an ingress packet into packet buffer 202. Device driver 206 may determine the location of the ingress packet in packet buffer 202 based on a return descriptor that describes such ingress packet. Device driver 206 may inform operating system 208 of the availability and location of such stored ingress packet. In one embodiment, device driver 206 may associate a buffer descriptor with each header, where the buffer descriptor is for the flow buffer that stores the payload associated with such header, in accordance with an embodiment of the present invention.

OS 208 may be any operating system executable by processor 110. In one embodiment, OS 208 may be any operating system that permits passing contents of a page buffer of information by "page-flipping" whereby a page buffer of data can be transferred by manipulating system page tables to swap entries within the system page table. Page flipping avoids the data copy that can be used to move data from the kernel space to the application space. For example, suitable embodiments of OS 208 include, but are not limited to, Linux, FreeBSD, or Microsoft Windows compatible operating systems.

TCP stack 209 may process packets to determine TCP/IP compliance in accordance with relevant TCP/IP standards. The TCP/IP protocol is described in the publication entitled "Transmission Control Protocol: DARPA Internet Program Protocol Specification," prepared for the Defense Advanced Projects Research Agency (RFC 793, published September 1981).

Socket layer 210 may transfer data from the TCP stack 209 to the application layer. For example, socket layer 210 may determine when to transfer contents of a flow buffer to an applications layer based in part on an indication in an associated buffer descriptor of whether the buffer is full or not full, in accordance with an embodiment of the present invention.

Flow buffer 212-0 to flow buffer 212-Z may store received payload and/or header portions of packets. Flow buffer 212-0 to flow buffer 212-Z may be implemented using page-sized buffers. In one embodiment, information stored in flow buffer 212-0 to flow buffer 212-Z may be transferred to a routine or application by a page-flipping operation. Each of buffer descriptors 211-0 to 211-Z may be associated with respective flow buffers 212-0 to 212-Z. In one embodiment, buffer descriptors 211-0 to 211-Z may each include a field that indicates whether the associated buffer is full or not full (depicted by the BF/BNF field). In addition, buffer descriptors 211-0 to 211-Z may describe the following parameters of the associated flow buffer 212-0 to 212-Z: protocol, addresses, pointers, checksum, priority, as well as other parameters included in, but not limited to, the Linux SKB network buffers.

Applications 214 can be one or more machine executable programs that access data from host system 102 or network 150. An application 214 may include, for example, a web browser, an e-mail serving application, a file serving application, or a database application.

The machine-executable instructions depicted in FIG. 2 may be implemented as any or a combination of: hardwired logic, software stored by a memory device and executed by a microprocessor, firmware, an application specific integrated circuit (ASIC), and/or a field programmable gate array (FPGA).

Figure 3:
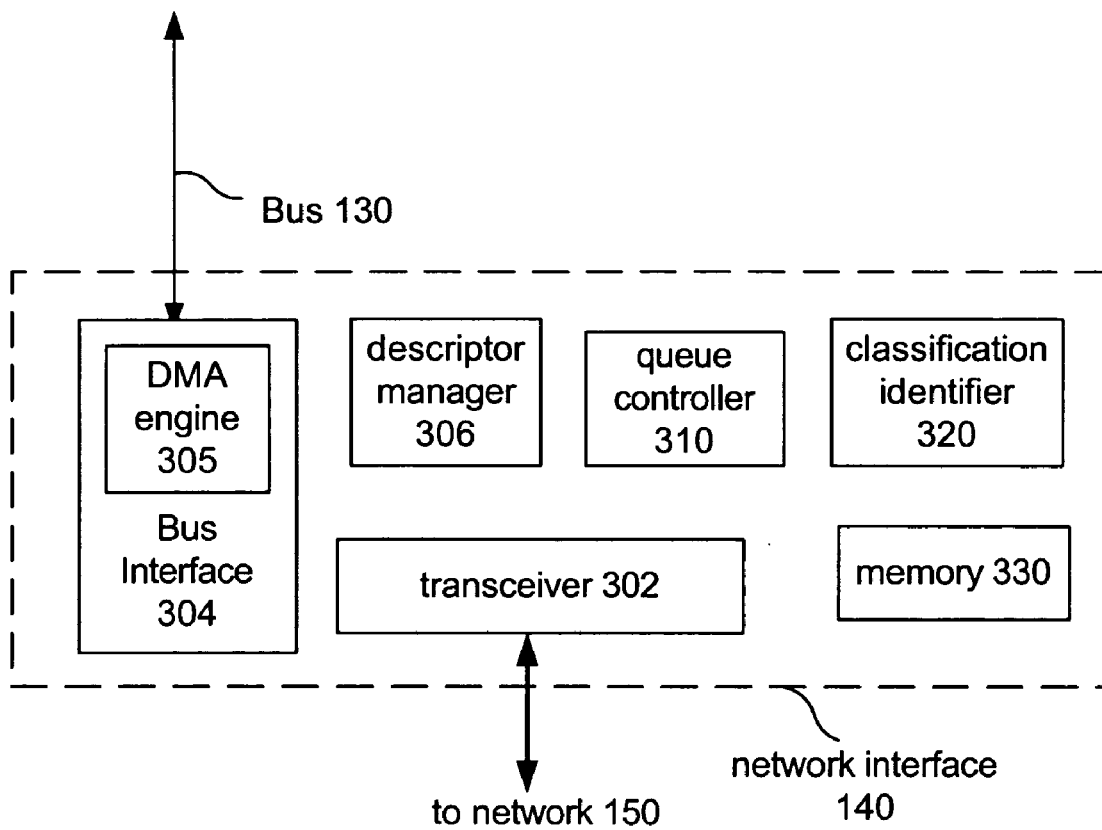
FIG. 3 depicts one possible embodiment of a network interface, in accordance with an embodiment of the present invention.

FIG. 3 depicts one possible embodiment of network interface 140 in accordance with an embodiment of the present invention, although other embodiments may be used. For example, another embodiment of network interface 140 may include, but is not limited to, a LAN on motherboard embodiment or the integration of a network access device into a motherboard or chipset used by processor 110. For example, one embodiment of network interface 140 may include transceiver 302, bus interface 304, descriptor manager 306, queue controller 310, classification identifier 320, and memory 330.

Transceiver 302 may include a media access controller (MAC) and a physical layer interface (both not depicted) capable of receiving and transmitting packets in conformance with applicable protocols such as Ethernet, although other protocols may be used. Transceiver 302 may receive and transmit packets from and to network 150 via a network medium.

Bus interface 304 may provide intercommunication between network interface 140 and bus 130. Bus interface 304 may be implemented as a PCI, PCI Express, PCI-x, serial ATA, and/or USB compatible interface (although other standards may be used). For example, bus interface 304 may include and utilize a direct memory access (DMA) engine 305 to perform direct memory accesses from host memory 118 and/or host storage 120 into network interface 140 or from network interface 140 into host memory 118 and/or host storage 120. For example, DMA engine 305 may perform direct memory accesses to transfer ingress packets into a buffer in packet buffer 202 identified by a return descriptor.

Descriptor manager 306 may initiate access of descriptors from the input queue of the receive queue. For example, descriptor manager 306 may inform DMA engine 305 to read a descriptor from the input queue of receive queue 206 and store the descriptor. Descriptor manager 306 may store descriptors that describe candidate buffers in packet buffer 208 that can store ingress packets.

Queue controller 310 may determine a buffer of packet buffer 202 to store at least one ingress packet. In one embodiment, based on the descriptors in descriptor storage 208, queue controller 310 creates a return descriptor that describes a buffer into which to write an ingress packet. Return descriptors may be allocated for transfer to host system 102 using output queues. Queue controller 310 may instruct DMA engine 305 to transfer each ingress packet into a receive buffer in packet buffer 202 identified by an associated return descriptor. For example, queue controller 310 may place the return descriptor in an output queue and provide an interrupt to inform host system 102 that an ingress packet is stored as described by the return descriptor in the output queue.

Classification identifier 320 may determine a classification associated with a packet based on properties of the associated header. The classification may be transferred to the host system 102 in a return descriptor.

Memory 330 may be implemented as a volatile or nonvolatile memory device (e.g., RAM, EEPROM, ROM, PROM, DRAM, or SRAM). Memory 330 may provide buffering and storage for information leaving and entering network interface 140.

Network interface 140 may be implemented as any or a combination of: hardwired logic, software stored by a memory device and executed by a microprocessor, firmware, an application specific integrated circuit (ASIC), and/or a field programmable gate array (FPGA).

Figure 4:
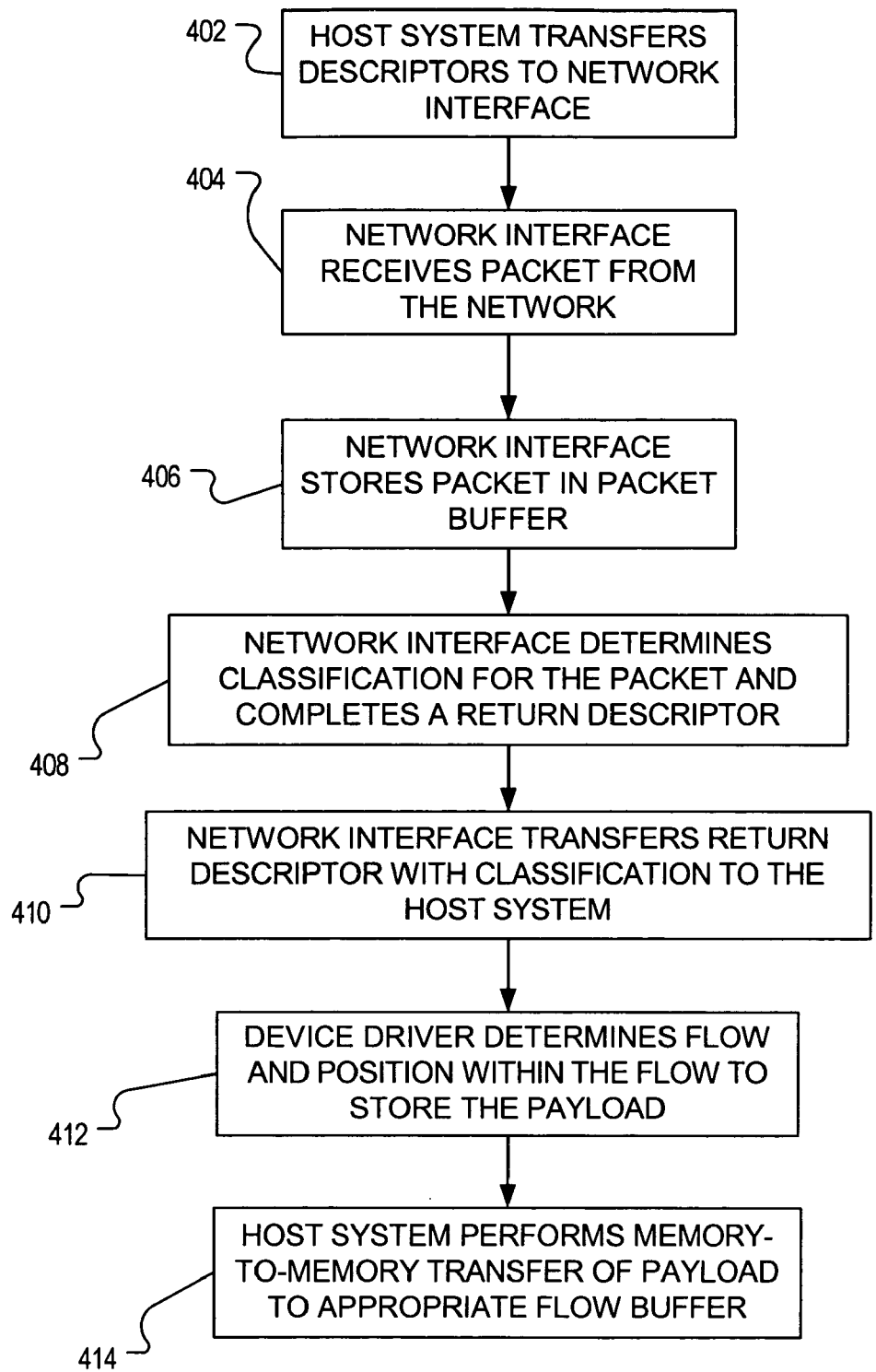
FIG. 4 depicts a flow diagram that may be used to allocate header and payload portions of a packet for storage into flow buffers, in accordance with an embodiment of the present.

FIG. 4 depicts a flow diagram that may be used to allocate header and payload portions of a packet for storage into flow buffers 212-0 to 212-Z, in accordance with an embodiment of the present. In block 402, device driver 206 may create one or more descriptors that each describe at least one location in packet buffer 202 in which to store header and payload portions of a packet received from network 150. Descriptors may be placed on the input queue of the receive queues 204 to transfer the descriptor to network interface 140.

In block 404, network interface 140 may receive at least one packet from network 150. For example the packet may be compliant with Ethernet format although other formats are permitted.

In block 406, network interface 140 may transfer one or more packet payload(s) and header(s) into host memory 118 based on the packet buffer location in a descriptor(s) from host system 102. For example, queue controller 310 of the network interface 140 may determine which buffer in packet buffer 202 is to store the ingress packet based on available descriptors. For example, based on the determined packet buffer in packet buffers 202, DMA engine 305 of network interface 140 may transfer the received ingress packet into the packet buffer of packet buffers 202.

In block 408, network interface 140 may determine a classification for the packet and complete a return descriptor for the packet. The classification may be a hash value calculated by network interface 140 based on header and/or payload of the packet that can be used to assist with flow identification and placement within the flow. For example, for TCP/IP connections, network interface 140 may determine classification using a 5 tuple. A 5 tuple may include packet source IP address, destination IP address, source port, destination port and protocol. For example, each classification can be assigned to a specific bulk data transfer (e.g., ftp session) or an application, although other assignments can be used. Network interface 140 may insert the classification into a return descriptor and complete other fields in the return descriptor that indicate the status and memory location in which the packet is stored.

In block 410, network interface 140 may transfer the return descriptor with the classification to host system 102. For example, queue controller 310 of network interface 140 may write the return descriptor to the appropriate output queue. For example, in block 410, network interface 140 may notify device driver 206 via an interrupt to request received packet processing. Queue controller 310 of network interface 140 can create an interrupt to inform device driver 206 that one or more ingress packets are stored as described by one or more return descriptors in the output queue.

In block 412, device driver 206 may determine a flow and location within the flow in which to store the packet payload. For example, each flow may have one or more associated flow buffers among flow buffers 212-0 to 212-Z and the flow buffers may be filled in a first-in-first-out format. In one embodiment, device driver 206 may determine the flow buffer and location within the flow buffer in which to store the payload (and/or header) based factors including but not limited to the classification as well as the storage capacity of each flow buffer and the association of flow buffers with flows. In one embodiment, each flow buffer may be page size and store approximately 4096 bytes, although other sizes may be used.

In block 414, based on the identified flow and identified location within the flow, device driver 206 may instruct memory-to-memory transfer device 125 in host system 102 to transfer the payload stored in a packet buffer of packet buffers 202 into the appropriate location(s) within flow buffer 212-0 to 212-Z. In one embodiment, headers may also be transferred into flow buffer 212-0 to 212-Z. Accordingly, by using memory-to-memory transfer device 125, device driver 206 may avoid data transfer operations using processor 110 and the associated resource use. After the payload has been placed into the specified location in the appropriate location(s) within flow buffer 212-0 to 212-Z, device driver 206 can issue an interrupt to the TCP stack 209 to indicate a packet is available for processing.

Figure 5:
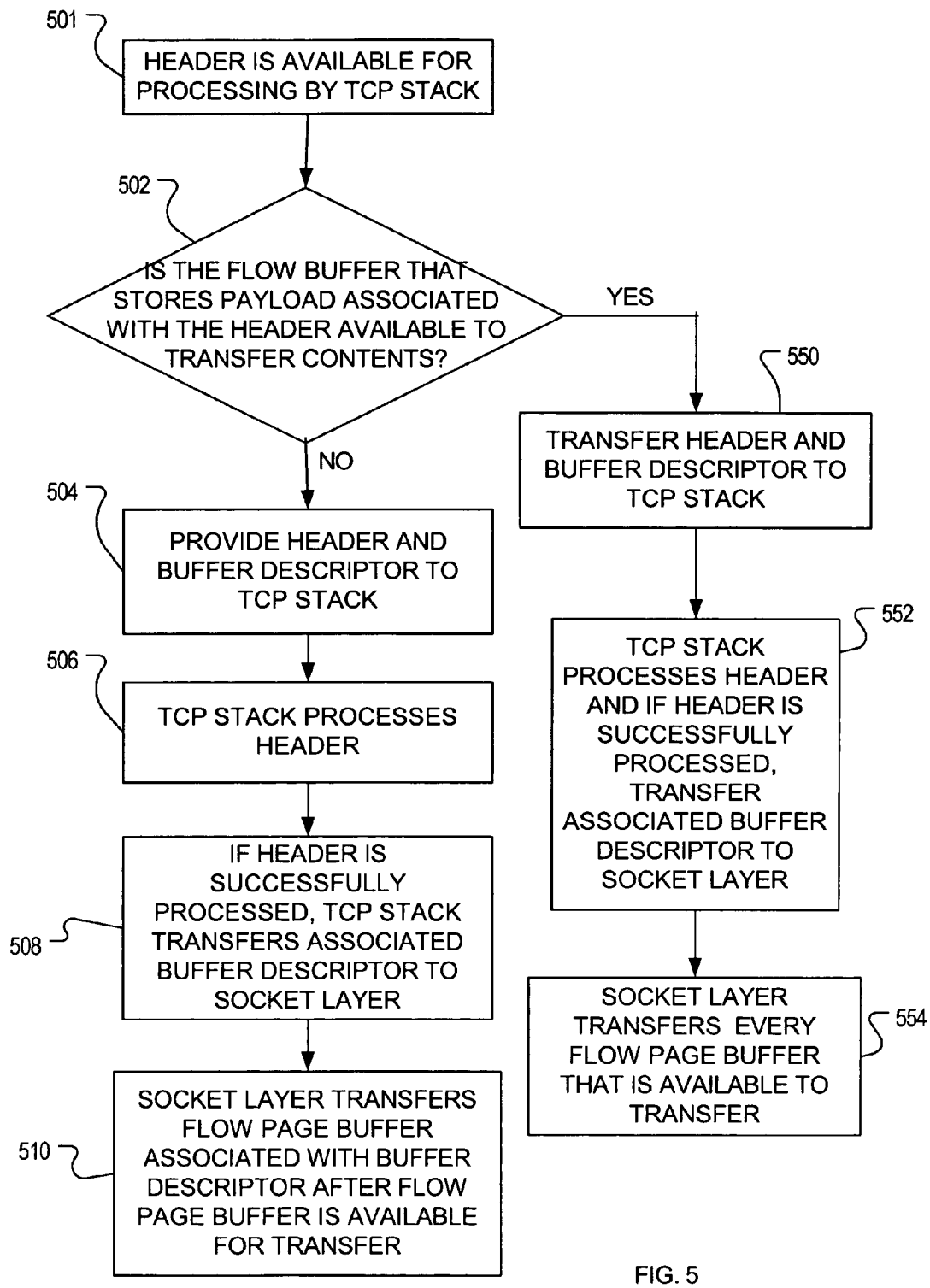
FIG. 5 depicts an example process to provide timely processing of an available header while permitting a flow buffer that stores the payload associated with the header to fill prior to transfer, in accordance with an embodiment of the present invention.

Flow buffer page sizes can be several times the standard maximum size for Ethernet frames. When storing payloads into a page, waiting for payloads to fill the entire page may cause problems for the TCP connection. Acknowledgements (ACK signals) may need to be generated for the received packets and information in the received headers may require timely processing. If the header processing is delayed by waiting for a page full of payloads or the end of the flow, TCP stacks could interpret this condition as an error. FIG. 5 depicts an example process to provide timely processing of an available header while permitting a flow buffer that stores the payload associated with the header to fill prior to transfer, in accordance with an embodiment of the present invention.

In block 501, a header is available for processing by TCP stack 209. In one embodiment, headers are made available for processing by TCP stack 209 as soon as possible. For example, a header can be made available by providing an interrupt to device driver 206 using a polling technique to determine whether any header is available for processing. Device driver 206 may transfer the headers to TCP stack 209 for processing.

In block 502, device driver 206 may determine whether the flow buffer (among flow buffers 212-0 to 212-Z) that stores a payload associated with the available header is ready to be transferred. For example, the flow buffer may be ready to be transferred when full. In one embodiment a "buffer full"/"buffer-not-full" flag in a buffer descriptor associated with the flow buffer is checked to determine whether the buffer is full. If the flow buffer is ready to be transferred, block 550 follows. If the flow buffer is not ready to be transferred, block 504 follows.

In one embodiment, when a flow buffer is not full and when conditions may be used such as when push, urgent and other protocol flags and error conditions require passing the payload associated with the available header and preceding pending payloads, the process may exit and payload(s) may be copied into an application buffer.

In block 504, device driver 206 may provide the header and associated buffer descriptor with the "buffer not full" (BNF) flag to TCP stack 209 for processing.

In block 506, TCP stack 209 may process the header to determine compliance with TCP/IP. TCP/IP protocol compliance may include, for example, verifying the sequence number of a received packet to ensure that the packet is within a range of numbers that was agreed upon between the communicating nodes; verifying the payload size to ensure that the packet is within a range of sizes that was agreed upon between the communicating nodes; ensuring that the header structure conforms to the protocol; generating an ACK signal for transmission to the source of the packet; and ensuring that the timestamps are within an expected time range.

Providing processing of the header while the associated payload is not ready for transfer permits TCP stack 209 to process headers in a timely manner (e.g., send ACK signals in a timely manner). If the header processing is delayed by waiting for a page full of payload or the end of the flow, TCP stack 209 could interpret such condition as an error.

In block 508, if the header is successfully processed, TCP stack 209 may transfer the associated buffer descriptor to a socket layer.

In block 510, the socket layer may transfer the flow page buffer associated with the buffer descriptor after the flow page buffer is available for transfer. For example, the socket layer may wait until the buffer that stores the payload associated with the header is full prior to performing page flipping to transfer the contents of such flow buffer to an application layer. For example, the socket layer may wait until a "buffer not full" flag in the associated buffer descriptor changes to "buffer full" to page flip contents of such flow buffer.

In block 550, device driver 206 transfers to TCP stack 209 the header that is available for processing and the buffer descriptor of the flow buffer that stores the payload associated with the header.

In block 552, TCP stack 209 processes the transferred header in accordance with TCP/IP standards to determine compliance with TCP/IP in a manner similar to that described with respect to block 506. If the header is successfully processed, TCP stack 209 may transfer the associated buffer descriptor to a socket layer of OS 208.

In block 554, the socket layer may transfer each flow page buffer that is available to transfer. For example, a flow page may be transferred to an applications layer. In block 554, socket layer may also transfer any flow page buffer that was not previously available to transfer but is available for transfer. For example, the socket layer may determine whether a buffer is available for transfer by detecting a change in state of the "buffer not full" flag in the associated buffer descriptor to "buffer full". A flow page may thereby be transferred by page flipping.

Figure 6:
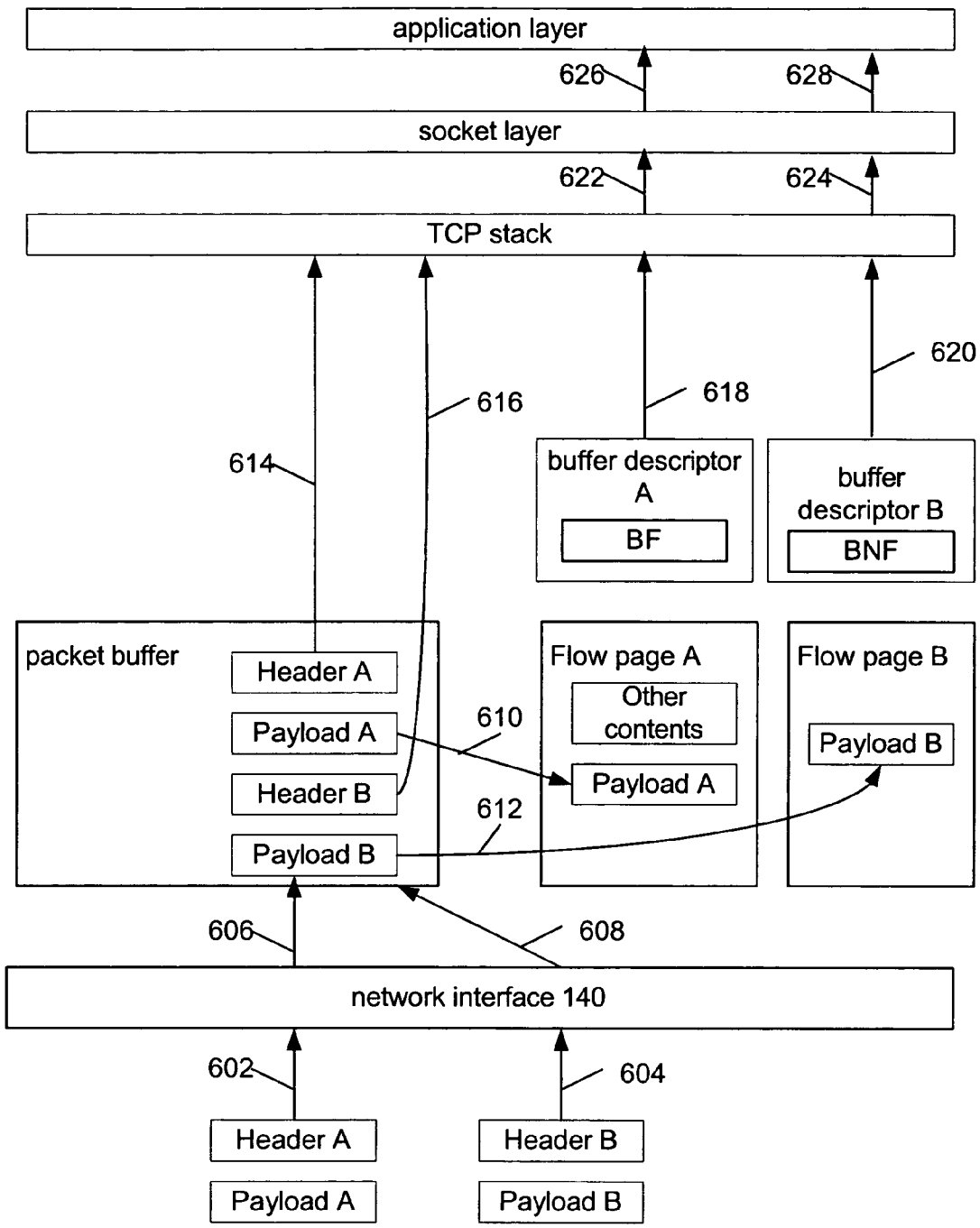
FIG. 6 depicts an example packet flow in accordance with an embodiment of the present invention.

FIG. 6 depicts an example packet flow in accordance with an embodiment of the present invention. At 602 and 604, network interface 140 receives respective packets A and B. At 606 and 608, network interface 140 transfers the header and payload portions of packets A and B into storage in packet buffer 202. At 610 and 612, based on flow identifier and location with the flow associated with the packets A and B, payloads A and B are transferred into storage in respective flow buffers A and B using, for example, memory-to-memory transfer device 125. Flow buffer A is filled by the addition of payload A however flow buffer B is not filled by addition of payload B.

At 614 and 616, headers A and B are transferred to TCP stack 209, respectively. At 618, buffer descriptor A for the flow buffer that stores the payload associated with header A is transferred to TCP stack 209 with a "buffer full" (BF) flag set. At 620, buffer descriptor B for the flow buffer that stores the payload associated with header B is transferred to TCP stack 209 with a "buffer not full" (BNF) flag set.

At 622 and 624, after headers A and B are determined to comply with TCP/IP, TCP stack 209 transfers buffer descriptors A and B to the socket layer of OS 208.

At 626, socket layer performs page flip for flow buffer A thereby making it available to applications in the applications layer. At 628, after waiting for flow buffer B to become full (as indicated in buffer descriptor B), socket layer flips page buffer B thereby making it available to applications in the application layer.

The drawings and the forgoing description gave examples of the present invention. While a demarcation between operations of elements in examples herein is provided, operations of one element may be performed by one or more other elements. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:
1. A method comprising:
  receiving a packet with a payload and a header associated with the payload;
  providing to a transport control protocol (TCP) stack, the header and a buffer descriptor associated with a flow buffer, wherein the flow buffer is to store the payload;
  determining whether the flow buffer is ready for processing based on an indication in the buffer descriptor;
  processing by the TCP stack, the header and the indication regardless of whether or not it is determined that the flow buffer is ready for processing;
  transferring the buffer descriptor from the TCP stack to a socket layer responsive to the processing; and
  transferring by the socket layer, the flow buffer responsive to the determination.

2. The method of claim 1, wherein the indication is generated based in part on whether the flow buffer that stores the payload is full.

3. The method of claim 1, wherein the indication comprises a flag in the buffer descriptor associated with the flow buffer that stores the payload and wherein the flag indicates whether the buffer is full.

4. The method of claim 3, wherein processing the header comprises determining TCP/IP compliance of the header.

5. The method of claim 4, wherein transferring the flow buffer comprises:
  selectively providing the flow buffer associated with the buffer descriptor to an application layer in response to the determination of the TCP/IP compliance of the header of the received packet and the flow buffer that stores the payload being available to transfer to the application layer.

6. The method of claim 5, wherein selectively providing the flow buffer associated with the buffer descriptor to the application layer comprises providing the flow buffer associated with the buffer descriptor to the application layer when a socket layer determines that the indication indicates that the flow buffer is full.

7. The method of claim 1, wherein the flow buffer is a page size buffer to support page flipping.

8. The method of claim 1, wherein the flow buffer is capable of being transferred by page flipping.

9. The method of claim 1, wherein the flow buffer is among a plurality of flow buffers and further comprising:
  storing the payload into a payload buffer;
  determining which flow buffer among the plurality of flow buffers in which to store the payload based in part on the header associated with the payload; and
  transferring the payload from the payload buffer into the determined flow buffer using a direct memory access operation.

10. An apparatus comprising:
a buffer to store a header;
a flow buffer to store at least a payload associated with the header; and
stack layer logic to:
provide to a transport control protocol (TCP) stack, the header and a buffer descriptor associated with the flow buffer;
determine whether the flow buffer is ready for processing based on an indication in the buffer descriptor;
process by the TCP stack, the header and the indication regardless of whether or not it is determined that the flow buffer is ready for processing;
transfer the buffer descriptor from the TCP stack to a socket layer responsive to the processing; and
transfer by the socket layer, the flow buffer responsive to the determination.

11. The apparatus of claim 10, wherein the indication is generated based in part on whether the flow buffer that stores the payload is available or not available for transfer.

12. The apparatus of claim 11, wherein the indication comprises a flag in the buffer descriptor associated with the flow buffer and wherein the flag indicates whether the buffer is full.

13. The apparatus of claim 10, wherein the flow buffer is a page size buffer to support page flipping.

14. The apparatus of claim 10, wherein the flow buffer is capable of being transferred by page-flipping.

15. The apparatus of claim 10, wherein the stack layer logic to process the header is to determine TCP/IP compliance of the header.

16. The apparatus of claim 15, wherein the stack layer logic to transfer the flow buffer is to:
selectively transfer the flow buffer associated with the buffer descriptor to an application layer in response to the determination of the TCP/IP compliance of the header and the indication indicates that the flow buffer is available for transfer to the application layer.

17. The apparatus of claim 16, wherein the socket layer logic to selectively transfer the flow buffer associated with the buffer descriptor to the application layer is to transfer the flow buffer associated with the buffer descriptor to the application layer when the socket layer logic determines that the indication indicates that the flow buffer is full.

18. The apparatus of claim 10 wherein the flow buffer is among a plurality of flow buffers and wherein a second buffer stores the payload and further comprising:
device driver logic to determine which flow buffer among the plurality of flow buffers to store the payload based in part on the header associated with the payload; and
a memory-to-memory transfer device to transfer the payload from the second buffer into the determined flow buffer using a direct memory access, wherein the determined flow buffer comprises the flow buffer to store at least a payload associated with the header.

19. A computer-readable medium comprising instructions stored thereon which when executed by a machine cause the machine to:
receive a packet with a payload and a header associated with the payload;
provide to a transport control protocol (TCP) stack, the header and a buffer descriptor associated with a flow buffer, wherein the flow buffer is to store the payload;
determine whether the flow buffer is ready for processing based on an indication in the buffer descriptor;
process by the TCP stack, the header of the received packet and the indication regardless of whether or not it is determined that the flow buffer is ready for processing;
transfer the buffer descriptor from the TCP stack to a socket layer responsive to the processing; and
transfer by the socket layer, the flow buffer responsive to the determination.

20. The computer-readable medium of claim 19, wherein the indication is generated based in part on whether the flow buffer that stores the payload is full.

21. The computer-readable medium of claim 19, wherein the indication comprises a flag in the buffer descriptor associated with the flow buffer that stores the payload and wherein the flag indicates whether the buffer is full.

22. The computer-readable medium of claim 19, wherein the flow buffer is a page size buffer to support page flipping.

23. The computer-readable medium of claim 19, wherein the flow buffer is capable of being transferred by page flipping.

24. The computer-readable medium of claim 19, wherein processing the header of the received packet comprises determining TCP/IP compliance of the header of the received packet.

25. The computer-readable medium of claim 24, wherein the machine to transfer the flow buffer is further to:
selectively provide the flow buffer associated with the buffer descriptor to an application layer in response to the determination of the TCP/IP compliance of the header of the received packet and the flow buffer that stores the payload being available to transfer to the application layer.

26. The computer-readable medium of claim 25, wherein selectively providing the flow buffer associated with the buffer descriptor to the application layer comprises providing the flow buffer associated with the buffer descriptor to the application layer when a socket layer determines that the indication indicates that the flow buffer is full.

27. The computer-readable medium of claim 22, wherein the flow buffer is among a plurality of flow buffers and the machine is further to:
store the payload into a payload buffer;
determine which flow buffer among the plurality of flow buffers in which to store the payload based in part on the header associated with the payload; and
transfer the payload from the payload buffer into the determined flow buffer using a direct memory access operation.

28. A system comprising:
a computing platform including a host processor, a memory device, and a memory-to-memory transfer device;
a network interface to receive at least one packet comprising a payload and header associated with the payload and to transfer the packet into a packet buffer in the memory device using the memory-to-memory transfer device; and
a bus capable of providing intercommunication among at least the computing platform and network interface, wherein the host processor is to:
transfer the payload into a flow buffer in the memory device;
provide to a transport control protocol (TCP) stack, the header and a buffer descriptor associated with the flow buffer;
determine whether the flow buffer is ready for processing based on an indication in the buffer descriptor;
process by the TCP stack, the header and the indication regardless of whether or not it is determined that the flow buffer is ready for processing; and transfer the buffer descriptor from the TCP stack to a socket layer responsive to the processing; and transfer by the socket layer, the flow buffer responsive to the determination.

29. The system of claim 28, wherein the bus is compatible with PCI express.

30. The system of claim 28, wherein the bus is compatible with PCI.

31. The system of claim 28, wherein the network interface is integrated into the computing platform.

32. The system of claim 28, wherein the host processor to process the header is to determine TCP/IP compliance of the header.

33. The system of claim 32, wherein the host processor to transfer the flow buffer is to selectively provide the flow buffer associated with the buffer descriptor to an application layer in response to the determination of the TCP/IP compliance of the header of the received packet and the flow buffer that stores the payload being available to transfer to the application layer.

* * * * *

UNITED STATES PATENT AND TRADEMARK OFFICE
CERTIFICATE OF CORRECTION

PATENT NO.       : 7,602,798 B2                                    Page 1 of 1
APPLICATION NO.  : 10/929124
DATED            : October 13, 2009
INVENTOR(S)      : Ronciak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Fifth Day of October, 2010

David J. Kappos
*Director of the United States Patent and Trademark Office*